Figure 1:
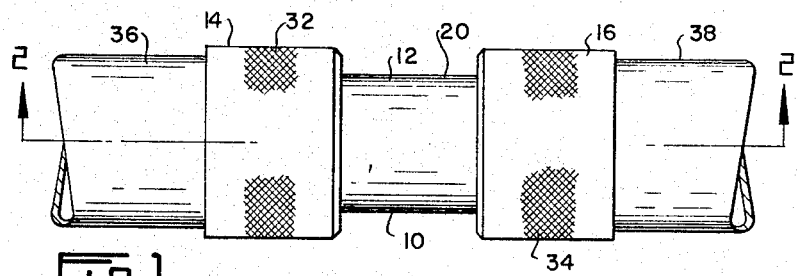

Dec. 6, 1966   C. H. BUCKLE   3,290,067
COUPLING DEVICE
Filed Aug. 2, 1963   3 Sheets-Sheet 1

INVENTOR
CECIL H. BUCKLE
BY
Fetherstonhaugh & Co.
ATTORNEYS

Dec. 6, 1966 C. H. BUCKLE 3,290,067
COUPLING DEVICE
Filed Aug. 2, 1963 3 Sheets-Sheet 2

INVENTOR
CECIL H. BUCKLE
BY
Fetherstonhaugh & Co.
ATTORNEYS

Dec. 6, 1966  C. H. BUCKLE  3,290,067
COUPLING DEVICE

Filed Aug. 2, 1963  3 Sheets-Sheet 3

INVENTOR.
CECIL H. BUCKLE
BY
Fetherstonhaugh & Co.
ATTORNEYS

United States Patent Office
3,290,067
Patented Dec. 6, 1966

3,290,067
COUPLING DEVICE
Cecil H. Buckle, North Vancouver, British Columbia, Canada, assignor to Goodall Rubber Company, Trenton, N.J.
Filed Aug. 2, 1963, Ser. No. 303,197
2 Claims. (Cl. 285—247)

This application is a continuation-in-part of the application Serial No. 21,343, filed April 11, 1960, now abandoned, and it relates to new and useful improvements in a fire-hose coupling device.

More specifically the invention, although suitable for use wherever it is desired to interconnect lengths of hose or tubing, has been particularly adapted for the rapid and dependable repair, in action, of damaged or burned lengths of fire hose without using anything other than an axe or a knife to cut off the damaged sections of the hose. These coupling units are thus particularly useful to firefighting crews operating in locations remote from repair facilities, such as forest fire fighting units, and the couplings have been proven to be a very desirable means for effecting a quick and reliable repair. The fire hose used in fighting forest fires is normally subjected to very rough usage, being frequently damaged in various ways, such as by the passage thereover of heavy trucks and equipment, which results in severage of the hose, or by hot embers which burn and cause leaks in the hose. Hitherto, there has been no quick and satisfactory way to manually make repairs in situ without the use of special tools and costly couplings.

It is an object of this invention therefore to provide a coupling unit which is integral and inexpensive, and which enables lengths of hose or similar flexible tubing to be interconnected in a simple rapid and efficient manner without the use of any special tools.

A further object of the invention is to provide a coupling unit which may be installed by a single operator in situ, and which, when employed to interconnect lengths of fire hose, does not measurably restrict the flow of water while providing an effective water-tight coupling capable of withstanding the normally-employed fire-fighting water pressures.

In accordance with these objects the present invention contemplates the provision of a light and thin coupling device made of especially high-strength material for interconnecting lengths of flexible tubing. In one of its forms, such a coupling device consists of a sleeve member provided at both ends with outwardly flared portions adapted to fit within the ends of the lengths of fire hose to be interconnected, and internally threaded cap members inseparably mounted on said sleeve member and movable longitudinally thereof, said cap members adapted to be threadably engaged with the outer periphery of the ends of said lengths of hose after insertion of the said sleeve member into the hose, thereby locking said coupling member to the hose.

Other features of the invention will be described hereinafter and referred to in the appended claims.

Figure 2:
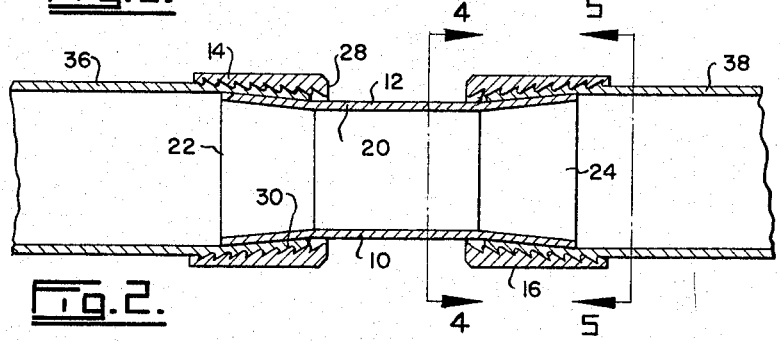
Figure 3:
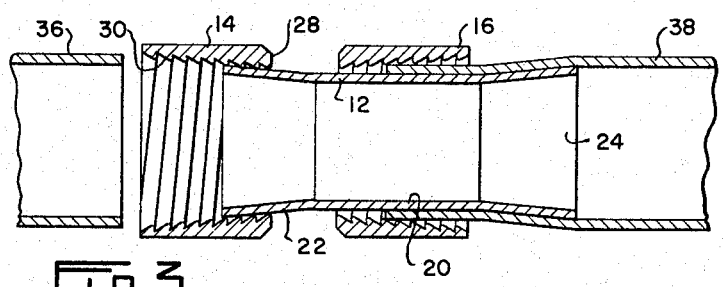
Figure 4:
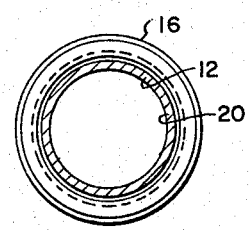
Figure 5:
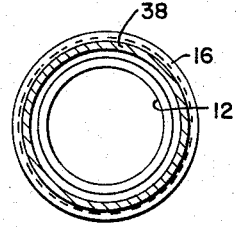
Figure 6:
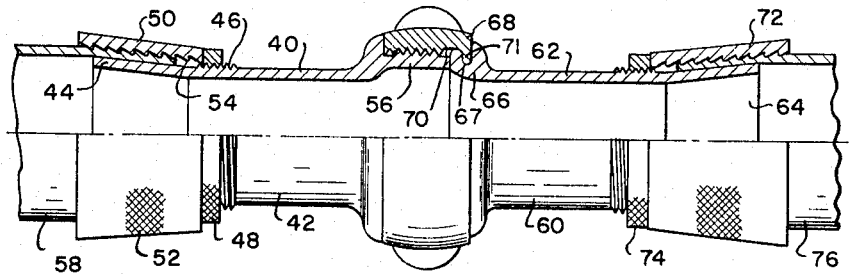
Figure 7:
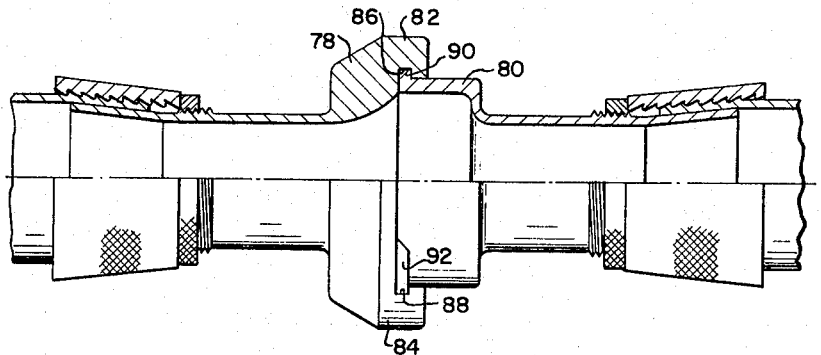
Figure 8:
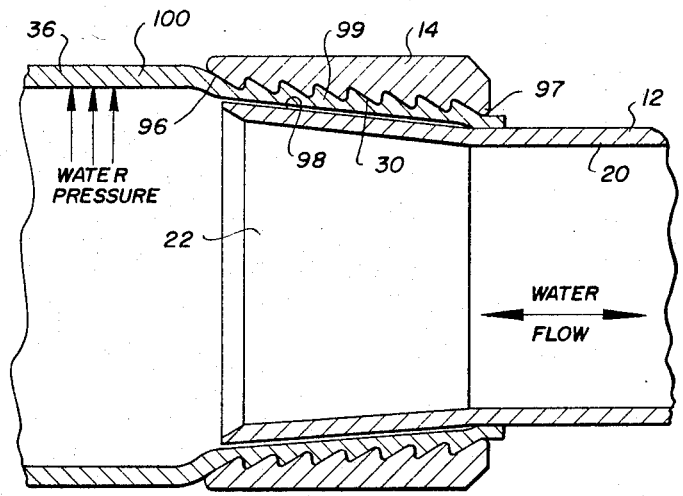

The invention will now be more particularly described in connection with the accompanying drawings which show by way of example various embodiments of the invention and in which:

FIGURE 1 is a side elevational view showing a coupling interconnecting two lengths of fire hose, FIGURE 2 is a sectional view on the line 2—2 of FIGURE 1, FIGURE 3 is a sectional view in elevation showing an intermediate stage in mounting the coupling on the fire hose, FIGURE 4 is a sectional view on the line 4—4 of FIGURE 2, FIGURE 5 is a sectional view on the line 5—5 of FIGURE 2, FIGURE 6 is a side elevational view partly in section showing an alternative form of coupling according to the invention, FIGURE 7 is a side elevational view partly in section showing a further embodiment of the invention, and FIGURE 8 diagrammatically illustrates how a piece of hose applied to this coupling is gripped thereby.

Referring to the drawing, the coupling unit indicated generally at 10 includes a tubular sleeve member 12 and a pair of cap members 14 and 16.

The sleeve member 12 consists of a cylindrical central portion 20 integrally formed with outwardly flared end portions 22 and 24. The central portion 20 is formed with an outside diameter slightly less than the inside diameter of the hose with which the coupling unit is to be employed, and the end portions 22 and 24 diverge outwardly from the central section with an appropriate taper to an outside diameter at their outer ends corresponding to the inside diameter of the hose. The sleeve member 12 is preferably formed from a non-rusting strong metal such as stainless steel, manganese bronze, or high-strength aluminum; but it may, in the smaller sizes of hose, be formed of plastic or any other suitably strong and corrosion-resistant material. The diverging end portions of the sleeve member 12 are outwardly tapered at an appropriate angle which is suited to the structure of the hose which is being coupled. To be specific, the angle is about 5° for old-style cotton hose which is rapidly being replaced in fire-fighting operations. For fire hose of a somewhat harder structure, such as that made under the Angus patents, the flare angle should be about 4°. For very soft hose, such as double-jacket corporation hose, the angle of flare or taper should be about 7°; and for very hard hose, such as hose woven from plastic material, the angle should be about 3°. If the angle is made too small for the particular hose being used, the hose will be damaged by the coupling when water pressure is applied. If, on the other hand, the angle is made too large, the hose may become disconnected on the removal of pressure. The angles referred to are those between the flare and the axis of the sleeve.

The cap members 14 and 16 are identical and only one of these, 14, will be described in detail. Cap member 14 is in the general form of a cylinder provided at one end with an inwardly projecting annular flange 28. The inner surface of the cap 14 is internally threaded as at 30, and the threaded portion 30 is tapered towards the flanged end of member 14 at a slightly greater (½°) angle than that used on the sleeve portions 22 and 24, thereby improving the gripping action of the cap on the hose, especially with the application of water pressure, and reducing any tendency for the cap to be pulled off the hose after the removal of pressure. In coupling units designed for use with rubber-lined hose, a comparatively deep thread is provided on the threaded portion 30 to offset the cushion effect of the rubber lining, but for use on unlined hose, it is preferable to use a shallow thread so as not to bite too deeply on the unlined hose. The shape of the thread has not been found to be critical, if the depth of the thread is suitably adjusted. The cap members 14 and 16 are each provided with knurled peripheral bands 32 and 34 respectively which bands provide suitable handgrips for threading the caps over the hose. The cap members are also fabricated from a strong non-rusting metal, but the choice of substance from which they are made is less critical than the choice of substance for the sleeve member 12.

In use, when it is desired to couple two sections of hose 36 and 38 using this coupling unit, the ends of the hose sections may need to be cut to make them approximately square. One end 24 of the sleeve 12 is then inserted into the end of hose section 38 and the cap 16 is threaded onto the end of hose 38, and screwed on till the hose shows through. The other end 22 of sleeve 12 is then inserted into the end of hose 36 and cap 14 is screwed onto the outer periphery of the end of hose 36. Thereafter, the two sections of hose on either side of the coupling are grasped and pulled in opposite directions thereby tightening the hose against the tapered end portions of the sleeve 12.

In an alternative form of the invention, as shown in FIGURE 6, mating male and female connectors are provided to interconnect two ends of hose.

As shown in FIGURE 6, the male connector 40 comprises a tubular sleeve 42 formed at one end with a flared portion 44. A portion 46 of the outer periphery of the sleeve adjacent to the flared portion 44 is provided with a thread adapted to receive an internally threaded lock nut 48. An annular frusto-conical cap 50 provided with a knurled periphery band 52 is loosely mounted on the sleeve 42. The cap 50 is provided with a shallow flat-topped internal thread 54 which tapers outwardly from end to end thereof at an angle corresponding to the taper of the flared portion 44 of sleeve 42. The other end of sleeve 40 is provided with an externally threaded spigot 56 which is formed integrally therewith. The male connector 40 is secured on a section 58 of hose by inserting the flared end 44 thereof into the end of the hose and screwing the cap 50 into position on the periphery of the hose. The hose and connector are then grasped and pulled in opposite directions to tighten the hose against the tapered portion 44 of the sleeve. The cap is retained in position by the lock nut 48 which is screwed manually to bear against the abutting end of the cap 50.

The female connector 60 is of essentially similar construction to the male connector 40 except that the sleeve member 62 is flared at one end 64 and provided with an extension 66 at its other end, said extension having an annular groove 67 found therein. An internally threaded rotatable annular member 68 is formed with a groove 70 just inside an inwardly-extending annular flange 71 on the end of said member. Flange 71 slidably fits in groove 67 to fix member 68 in a longitudinal direction relative to extension 66 while allowing circumferential rotation of said member. The groove 70 provides for a tight fit between adjacent parts of extension 66 and member 68. The connector 60 is provided with a cap member 72 and a lock nut 74 which are identical with the corresponding members 50 and 48 respectively of the male connector 40. The female connector 60 is mounted on the end of hose 76 in the same manner as male connector 40 is mounted on hose 58. The male connector 40 is adapted to form a tight coupling with the female connector 60, this coupling being effected by threadably engaging spigot 56 with the rotatable member 68. In this manner the two lengths of hose 58 and 76 may be quickly and releasably coupled together.

It will be apparent that a variety of other standard connecting fitments other than those shown in FIGURE 6 may be formed on the non-flared ends of the sleeve members 42 and 62 enabling them to be utilized in many different types of applications.

Thus, for example, FIGURE 7 shows a coupling unit similar to that of FIGURE 6 except that the externally threaded spigot 56 and the extension 66 and rotatable member 68 are replaced with the interfitting instantaneous connector heads 78 and 80 respectively. The heads 78 and 80 are of standard design, the head 78 being provided with at least two lugs 82 and 84 having grooves 86 and 88 respectively adapted to receive the wedge-shaped lugs 90 and 92 formed on the head 80. The two heads 78 and 80 may be firmly interlocked by inserting lugs 90 and 92 into the grooves 86 and 88 and rotating the heads relative to each other through approximately a quarter turn, thus causing the lugs 90 and 92 to become firmly wedged within the grooves 86 and 88 to effect a tight coupling between the two heads.

It will be understood that flared portions or sections 44 and 64 of the couplings illustrated in FIGURES 6 and 7 are made to operate with their respective cap members 50 and 72 in the same manner as the previously-described flared portions or sections 22 and 24 with their cap members 14 and 16. FIGURE 8 diagrammatically illustrates the way in which the cap members tighten the hoses on to the tapered portions of the sleeves when water under pressure passes through the hose, reference being made to cap member 14, flared portion 22 and hose 36.

Referring to FIGURE 8, it will be seen that thread 30 of cap 14 forms an outwardly-bevelled entrance 96 at one end of the cap, and an inwardly-extending flange 97 constituting a deep threaded section at the opposite end of said cap. As shown in the drawings the deep convolution of threads at flange 97 has a crest which is closer to the sleeve member 12 than are the remaining threads on the shallow threaded portion of the cap member. In FIG. 8, it will be observed that the hose is compressed at flange 96 inasmuch as the difference in diameters between the crests of flange 97 and the outside diameter of the sleeve member 12 is less than twice the uncompressed wall thickness of the hose. After the flared end 22 of sleeve member 12 has been inserted into the end of hose 36 and the latter has been drawn outwardly relative to the sleeve, flange 97 of the cap first presses the hose against the flared section where said section joins sleeve 12. When water under pressure first flows through the hose and coupling, the water tends to seep into the interface or space 98 (exaggerated in FIGURE 8) between flared portion 22 and the hose portion 99 lying over said flared portion. This lubricates the outer surface of the flared portion and the inner surface of the hose so that as the portion of the hose beyond the coupling, indicated at 100, tends to expand under the pressure of the water, the hose portion 99, which cannot expand because of cap 14, is drawn longitudinally towards the free end of flared section 22 and it is forced by pressure into a more firm contact with the cap threads. As threads 30 of the cap are biting into the outer surface of hose portion 99, said cap moves with portion 99 firmly to join said hose portion against the outer surface of section 22. Thus, the higher the pressure of the water, within the strength capacity of the hose, the tighter is hose section 99 pressed against the flared end of the sleeve.

Although each flared end of the coupling sleeves may be shaped in any desired manner, it is preferably mechanically expanded by a suitable expanding tool.

It will be noted that in the preferred form of coupling as shown in FIGURES 1 to 5, both the inner and outer surfaces of the sleeve member and its associated flared end portions is absolutely smooth. The smooth outer surfaces of the flared end portions permit the action described above in connection with FIGURE 8, while the smooth inner surface permits a minimum of resistance to the flow of water through the device. As each flared portion or section diverges to a maximum at the outer end of said portion or section, which is the inside diameter of the hose piece, there is practically no resistance to the water flow at said outer ends, and the water cannot get between the flaring surface and the hose piece once said hose piece has been tightly drawn into place. There is no lead-in surface at either of said outer ends to direct water between the tightly-fitting hose and the flaring surface.

The coupling units in accordance with this invention thus provide a simple, convenient and rapid means for interconnecting lengths of hose. No special tools are required to effect the interconnection, and when joining together lengths of damaged fire hose, the damaged sections of hose may be removed and the ends of the hose may be trimmed by means of a jack-knife or an axe which are usually in the possession of the fireman. These coupling units may be installed by a single fireman in action, and the whole operation will take less time than that required to substitute a new length of hose, thus saving time and also saving hose, because short undamaged lengths of hose may be easily re-used, instead of being scrapped as has been the normal practice hitherto.

It will be noted that in each of the illustrated couplings the flared end portions or sections form internally thereof funnels with smooth inner surfaces that lead the water smoothly into the sleeve between said end portions. This provides a more or less venturi action with the speed of the water increasing in the sleeve without generating any turbulence, and then returning to normal speed as it leaves the coupling through the down-stream funnel or flared end portion.

What I claim as my invention is:

1. A joint including a coupling device and a length of hose connected to said coupling device; said coupling device comprising a thin and smooth tubular sleeve member having a central portion of slightly less diameter than the inside diameter of said hose length and having an end portion flaring outwardly continuously to an end of a diameter the same as said inside diameter, an outer surface of said flared end portion being smooth and unbroken, the flare on said end portion being constant and lying within the range of 3° to 7°, and a cap member inseparably mounted on the sleeve member and movable therealong, said cap member having an inner surface tapered in the same direction and at substantially the same angle as the taper of the flared end portion over which said cap member fits, said cap member having a minimum internal diameter which is less than the outside diameter of said end of said tubular sleeve member, said cap member being internally threaded and having a deep convolution of said threads located in a deep threaded section proximate to its smaller diameter end and a shallow threaded section with shallow threads located adjacent said deep threaded section and extending toward the larger diameter end of said cap member, said deep convolution having its crest lying closer to said sleeve member than do the threads in the shallow threaded section, said crest extending inwardly from said inner surface of said cap member a distance which is greater than the distance to which said shallow threads extend; said central portion of said sleeve having an outside diameter which differs from the inside diameter of said cap member taken across the crest of said deep convolutions by a distance which is less than twice the uncompressed wall thickness of said hose; whereby the deep threaded section of said cap member will cause said hose to seal more firmly against said sleeve than will said shallow threaded section, thus permitting the entry of fluid within the hose into the interface between said sleeve and the inner portion of said hose located within the shallow threaded section in order to lubricate and pressurize said interface to force said hose member more firmly into contact with the threaded portion of the cap member and to permit sliding movement of said hose together with said cap member on said sleeve upon the application of fluid pressure to the interior of said sleeve and length of hose.

2. A joint as described in claim 1 in which said coupling device includes a pair of oppositely oriented said end portions extending from said central portion, two cap members cooperating with their respective end portions as aforesaid, and two said lengths of hose being interconnected together as aforesaid.

References Cited by the Examiner

UNITED STATES PATENTS

| 582,022 | 5/1897 | Nixon. | |
|---|---|---|---|
| 2,248,576 | 7/1941 | McConnohie | 285—247 |
| 2,853,320 | 9/1958 | Liebelt | 285—247 |
| 2,937,892 | 5/1960 | Prescott | 285—245 |

FOREIGN PATENTS

| 121,283 | 4/1946 | Australia. |
| 210,559 | 3/1956 | Australia. |
| 210,848 | 3/1956 | Australia. |
| 53,912 | 11/1937 | Denmark. |
| 728,404 | 7/1932 | France. |
| 1,211,974 | 3/1960 | France. |
| 194,818 | 3/1938 | Switzerland. |

CARL W. TOMLIN, *Primary Examiner.*

R. A. GIANGIORGI, *Assistant Examiner.*